(12) United States Patent
Merten et al.

(10) Patent No.: US 11,048,446 B2
(45) Date of Patent: Jun. 29, 2021

(54) DATA EXPANSE USING MEMORY-MAPPED FILES ON A SYSTEM ARCHITECTURE INTERFACE LAYER-BASED MAINFRAME OPERATING SYSTEM

(71) Applicants: James F Merten, Roseville, MN (US); Warren N Stockton, South Jordan, UT (US); Michael J. Rieschl, Roseville, MN (US); James R McBreen, Roseville, MN (US)

(72) Inventors: James F Merten, Roseville, MN (US); Warren N Stockton, South Jordan, UT (US); Michael J. Rieschl, Roseville, MN (US); James R McBreen, Roseville, MN (US)

(73) Assignee: Uniys Corporation, Blue Bell, PA (US)

( * ) Notice: Subject to any disclaimer, the term of this patent is extended or adjusted under 35 U.S.C. 154(b) by 209 days.

(21) Appl. No.: 14/573,245

(22) Filed: Dec. 17, 2014

(65) Prior Publication Data

US 2016/0179797 A1    Jun. 23, 2016

(51) Int. Cl.
*G06F 17/30* (2006.01)
*G06F 3/06* (2006.01)
*G06F 12/06* (2006.01)
*G06F 12/0802* (2016.01)
*G06F 12/0873* (2016.01)

(52) U.S. Cl.
CPC .......... *G06F 3/0673* (2013.01); *G06F 12/063* (2013.01); *G06F 12/0802* (2013.01); *G06F 12/0873* (2013.01); *G06F 2212/152* (2013.01)

(58) Field of Classification Search
CPC ................. G06F 12/10; G06F 12/0802; G06F 2212/152; G06F 12/00
See application file for complete search history.

(56) References Cited

U.S. PATENT DOCUMENTS

| 5,146,571 | A  | * | 9/1992  | Logan  | G11B 20/1883 711/206 |
|---|---|---|---|---|---|
| 5,442,779 | A  | * | 8/1995  | Barber | G06F 8/31 |
| 6,564,215 | B1 | * | 5/2003  | Hsiao  | G06F 11/1469 |
| 7,210,137 | B1 | * | 4/2007  | Tamma  | G06F 17/2247 717/143 |
| 8,335,775 | B1 | * | 12/2012 | Sedlar | G06F 17/30233 707/639 |

(Continued)

OTHER PUBLICATIONS

On Memory Mapped Files, Jul. 19, 2013, https://ayende.com/blog/162791/on-memory-mapped-files.

(Continued)

*Primary Examiner* — Usmaan Saeed
*Assistant Examiner* — William P Bartlett

(57) ABSTRACT

Systems and methods for obtaining access to database files in a computing system. A method may include receiving a first call from a database management system requesting access to a database file. The method may further include transmitting a second call to an operating system interface requesting that a memory-mapped data expanse file be created. The method may also include receiving a first address representing the database file in response to successful mapping of the database file to the memory-mapped data expanse file located at the operating system interface.

14 Claims, 9 Drawing Sheets

(56) References Cited

U.S. PATENT DOCUMENTS

| | | | | |
|---|---|---|---|---|
| 8,423,733 B1* | 4/2013 | Ozdemir | ............... | G06F 3/0604 |
| | | | | 711/162 |
| 2005/0081009 A1* | 4/2005 | Williams | ................ | G06F 3/061 |
| | | | | 711/163 |
| 2005/0097289 A1* | 5/2005 | Burton | ................ | G06F 11/1471 |
| | | | | 711/162 |
| 2008/0155224 A1* | 6/2008 | Crandall | ................ | G06F 12/10 |
| | | | | 711/203 |
| 2012/0036334 A1* | 2/2012 | Horman | .................... | G06F 9/52 |
| | | | | 711/165 |
| 2012/0233434 A1* | 9/2012 | Starks | .................. | G06F 3/0644 |
| | | | | 711/170 |
| 2014/0059094 A1* | 2/2014 | Shankar | ............ | G06F 17/30091 |
| | | | | 707/827 |
| 2014/0195564 A1* | 7/2014 | Talagala | ................ | G06F 11/141 |
| | | | | 707/802 |
| 2015/0081998 A1* | 3/2015 | Post | ........................ | G06F 12/00 |
| | | | | 711/173 |
| 2016/0154812 A1* | 6/2016 | Lee | ........................ | G06F 16/28 |
| | | | | 707/736 |

OTHER PUBLICATIONS

Ken Henderson's WebLog, Memory-mapped files and how they work, Jan. 30, 2006, https://blogs.msdn.microsoft.com/khen1234/2006/01/30/memory-mapped-files-and-how-they-work/.

* cited by examiner

DATA EXPANSE USING MEMORY-MAPPED FILES ON A SYSTEM ARCHITECTURE INTERFACE LAYER-BASED MAINFRAME OPERATING SYSTEM

FIELD OF THE DISCLOSURE

The instant disclosure relates generally to database systems. More specifically, this disclosure relates to a database system that includes a data expanse viewer using memory-mapped files on a System Architecture Interface Layer (SAIL) based mainframe operating system.

BACKGROUND

Database management systems traditionally provide for the management of data in a particular database and the management of access to that data by many different user programs. The user programs are often written in a high level language, such as C, C++, Java, or some other analogous language. The user program typically performs a call of the database management system when a database operation is to be performed.

Conventional database management systems have numerous drawbacks. For example, conventional systems require the caching of data in the database management system, which requires the database management system to manage data control using locks and test & set operations on the underlying data file. Beyond the cache control requirement, conventional database management systems are required to address various portions of database files to access data managed by the database, and often times the addressable range of the database management system is smaller than the maximum size of database files. Thus, the requirement that the database management system address data from database files becomes a hindrance to conventional database management systems because it limits the size of the database files that can be managed, or at the very least limits a user application to addressing only data that is located in a particular range of addresses. As database file sizes continue to increase, the issues associated with conventional database management systems will only become more problematic.

SUMMARY

The accessing of database files may be improved with systems and methods that provide data expanse views of memory-mapped files on certain operating systems, including SAIL-based operating systems. According to one embodiment, a method for obtaining access to database files in a computing system may include receiving, at an operating system, a first call from a database management system requesting access to a database file. The method may also include transmitting, from the operating system, a second call to an operating system interface requesting that a memory-mapped data expanse file be created. The method may further include receiving, at the operating system, a first address representing the database file in response to successful mapping of the database file to the memory-mapped data expanse file located at the operating system interface.

According to another embodiment, a computer program product may include a non-transitory computer-readable medium comprising instructions which, when executed by a processor of a computing system, cause the processor to perform the step of receiving a first call from a database management system requesting access to a database file. The medium may also include instructions which cause the processor to perform the step of transmitting a second call to an operating system interface requesting that a memory-mapped data expanse file be created. The medium may further include instructions which cause the processor to perform the step of receiving a first address representing the database file in response to successful mapping of the database file to the memory-mapped data expanse file located at the operating system interface.

According to yet another embodiment, an apparatus may include a memory and a processor coupled to the memory. The processor may be configured to execute the step of receiving a first call from a database management system requesting access to a database file. The processor may also be configured to perform the step of transmitting a second call to an operating system interface requesting that a memory-mapped data expanse file be created. The processor may be further configured to perform the step of receiving a first address representing the database file in response to successful mapping of the database file to the memory-mapped data expanse file located at the operating system interface.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

Figure 1A:
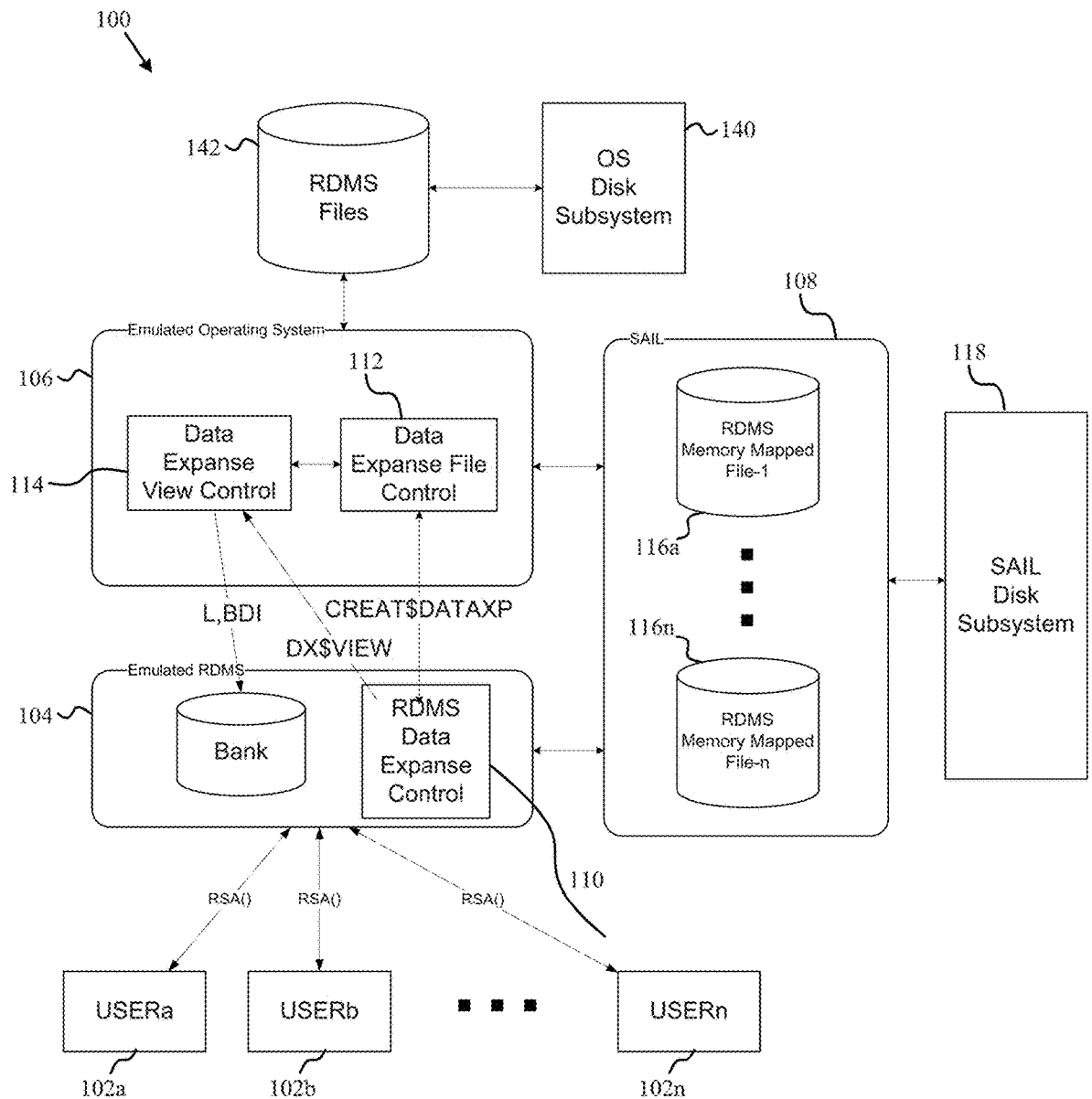
FIG. 1A is a first schematic block diagram illustrating a computing system including a database management system according to one embodiment of the disclosure.

FIG. 1A provides an illustration of a computing system including a database management system according to one embodiment of the disclosure. In system 100, the instruction set of the computing system may be emulated or translated, via software, executing on an underlying instruction set and operating system, such as from a commodity instruction processor, such as the x86 processor, and Linux. As shown, the system 100 may include a plurality of user applications 102*a-n* communicatively coupled to a database management system 104. In some embodiments, one or more query statements may be received by the database management system (DMS) 104 from the plurality of user applications 102*a-n*. The database management system 104 may analyze the query statement to determine if there are any errors in the statement itself. The user applications 102*a-n* can be located, for example, on the same computing device as the database management system 104, or on a different computing device or devices that are communicatively connected thereto. Examples of computing devices useable to execute computing instructions constituting the user applications 102*a-n* and the database management system 104 are discussed below in connection with FIGS. 6-8.

In the embodiment shown in FIG. 1A, the database management system 104 may be a relational database management system (RDMS) configured to receive and process SQL commands from the plurality of user applications 102*a-n* to perform operations on database files. The database management system 104 may be configured to access an emulated operating system 106. The emulated operating system 106, which may be, for example, Linux, Windows, Java, Unix, OS 2200, or the like, may execute on a server, controlled by SAIL 108, and include drivers for accessing hardware components. The emulated operating system 106 may be configured to access an OS disk subsystem 140 to store database files, such as RDMS files 142, at the OS disk subsystem 140 or to retrieve database files 142 from the OS disk subsystem 140. According to some embodiments, the database files 142 may be physically stored at the OS disk subsystem 140. The emulated operating system 106 may access the OS disk subsystem 140 to provide access to one or more database files 142 to the database management system 104, the plurality of user applications 102*a-n*, and an interface 108.

An interface 108, such as SAIL 108, may provide an interface between the emulated operating system 106 executing on a server and an operating environment, such as Linux, thereby providing the underlying operating system on which an operating environment executes. In some embodiments, SAIL 108 may include the emulated operating system 106 and the layer in which the operating environment executes, such as Linux. In some embodiments, SAIL 108 may be responsible for loading and initializing instruction processor emulators in the computer system 100. According to another embodiment, SAIL 108 may also acquire and initialize the initial memory area used by an operating environment and pass a pointer to the initial memory area to instruction processor emulators during a computer system startup.

The SAIL 108 may also interface with SAIL disk subsystem 118, which may physically store memory-mapped data expanse files 116, to provide access to one or more memory-mapped data expanse files 116 to the emulated operating system 106, the database management system 104, and the plurality of user applications 102*a-n*. For example, in some embodiments, one or more database files 142 retrieved by the emulated operating system 106 from the OS disk subsystem 140 may be mapped to one or more memory-mapped data expanse files 116*a-n* located at the SAIL 108 and stored at the SAIL disk subsystem 118. As shown in FIG. 1A, a plurality of memory-mapped data expanse files 116 may be located at the operating system interface 108, and each memory-mapped data expanse file 116*a-n* of the plurality of memory-mapped data expanse files 116 may represent a different mapping to a different database file 142. The SAIL 108 may transmit addresses representing the created data expanses 116*a-n* to the emulated operating system 106, and the addresses may be utilized by the database management system 104 and the plurality of user applications 106*a-n* to access data in the database files 142 via the data expanses 116*a-n* located at the SAIL 108.

The emulated operating system 106 can be any of a variety of operating systems capable of hosting a database management system 104 and which provides access controls to data stored in database files 142 on the OS disk subsystem 140. In one example embodiment, the emulated operating system 106 can be an operating system from Unisys Corporation of Blue Bell, Pa. In alternative embodiments, other operating systems could be used as well.

In the embodiment shown in FIG. 1A, the database management system 104 includes the RDMS a data expanse control 110. The data expanse control manages the creation of a memory-mapped data expanses and view requests for data stored in various memory-mapped data expanses that are managed by the SAIL 108. Cooperatively, the emulated operating system 106 includes a data expanse file control component 112 and a data expanse view control component 114. In some embodiments, the RDMS data expanse control 110 can transmit a request to the emulated operating system 106, in the form of a call to the data expanse file control component 112 to create a data expanse defined by the attributes of a database file (shown as the call CREAT$DA-TAXP). This call may tell the emulated operating system 106 to call an acquire function associated with the SAIL 108 or 122 to create the memory mapped data expanse file. Once the memory-mapped data expanse is initialized, by transferring data from the RDMS Files 142 to the RDMS Memory Mapped file 116, the database management system 104 is returned the address call-back into the emulated operating system 106 to manage the memory-mapped data expanse.

Following creation of the memory-mapped data expanse, the data expanse control 110 can be used by any of the user applications 102*a-n* to access and/or modify data in the memory-mapped data expanse by creating a view of the data expanse. In one embodiment, the data expanse may be the memory mapped data expanse created by the CREAT$DA-TAXP call. The data expanse view may be a bank created by the operating system 106 in response to a DX$VIEW. The bank may be a visible subset or view of the data expanse. For example, each of the user applications can request a different view of the data expanse, defined by a starting address (i.e., an offset from the starting address returned to the RDMS data expanse control 110), as well as a size of the view to be created. This can be accomplished, for example as shown, using the operating system call DX$VIEW, providing the starting address and size of the view to be created. The data expanse view control component 114 can then create a view of the data expanse, and provide to the database management system 104 a private address of the view. For example, the address can be an extended virtual mode address, including a length and a bank descriptor index to reference the location of the view.

In some embodiments, the data expanse may be referenced by its starting address or by an address of a particular segment, therefore the RDMS data expanse control 110 and other portions of the database management system 104 may not need to be capable of addressing the entire range of the data expanse created. Rather, the particular view created within the data expanse may be fully addressable by the database management system 104. In this way, a database management system, such as system 104, can be made compatible with data files having sizes greater than a maximum addressable range of the database management system. For example, in some embodiments of the present disclosure, the database management system 104 may be capable of individually addressing addresses in a bank of 262 thousand words; in such an arrangement, the database file 142 can have a size in excess of that number, since the address identified by the database management system to the emulated operating system 106 might identify an offset on a bank-by-bank basis, rather than on an individual, word-addressable basis.

Furthermore, using the system 100 as illustrated, a bank may be made accessible to the database management system 104 without requiring that the database management system cache each database file. Still further, and in contrast to locking a bank (and corresponding database file) to a particular application, the data expanse arrangement of FIG. 1A may allow a database file to be individually accessed by many different user applications 102*a-n* concurrently. By providing a private view into a publicly accessible database file the database management system 104 and emulated operating system 106 may alleviate many possible data conflicts. Additional information regarding data expanses is provided in U.S. Patent Application Publication No. 2014/0149459 entitled "Data expanse viewer for database systems," which is hereby incorporated by reference.

Figure 1B:
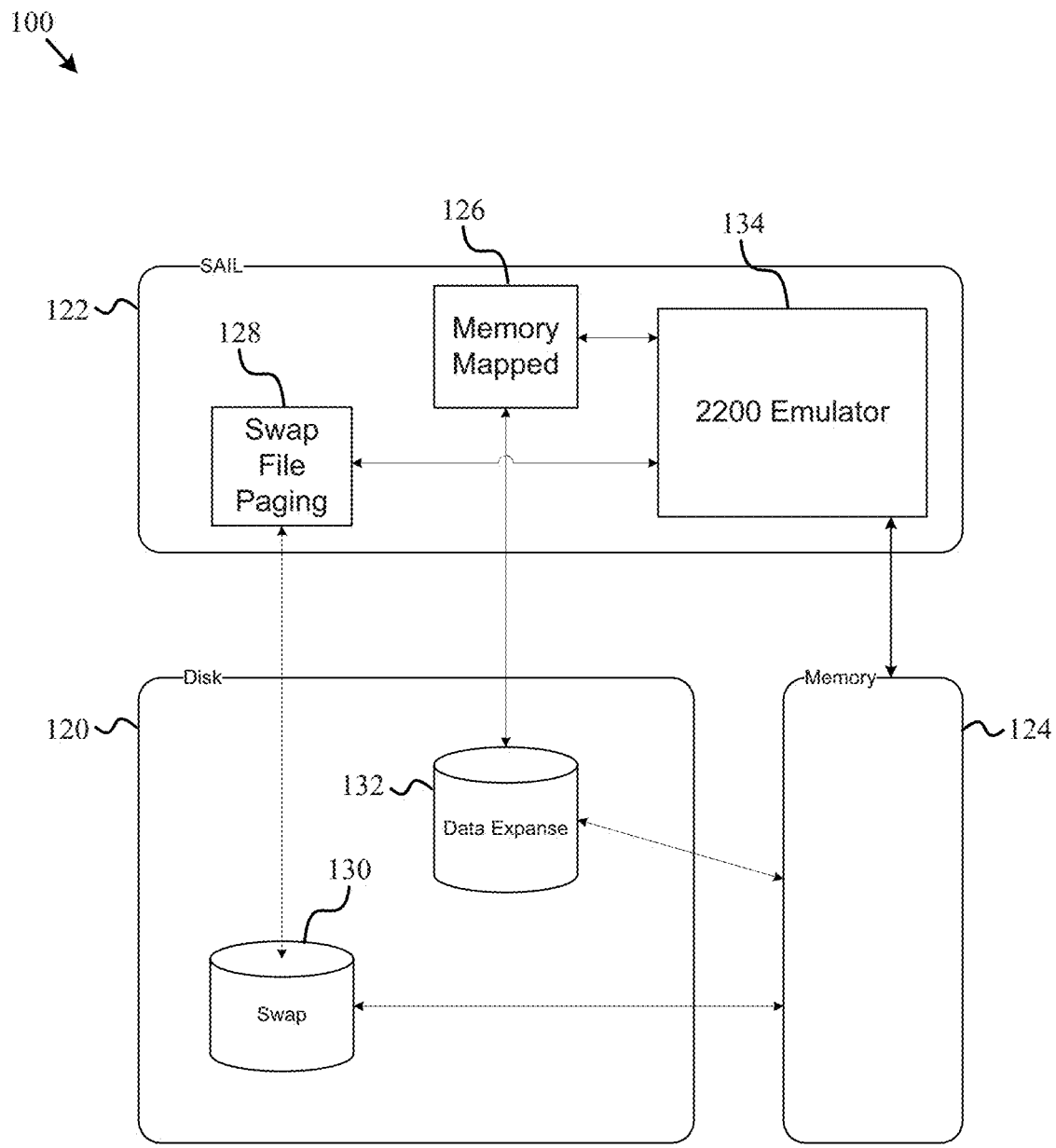
FIG. 1B is a second schematic block diagram illustrating a computing system including a database management system according to one embodiment of the disclosure.

FIG. 1B provides another illustration of a computing system including a database management system according to one embodiment of the disclosure. In particular, FIG. 1B illustrates the coexistence of both swapped and memory-mapped files in a computing system. In general, a swap file may allow an operating system to use hard disk space to simulate extra memory. For example, when the system runs low on memory, the system may swap a section of RAM that an idle program is using onto the hard disk to free up memory for other programs. When the system subsequently accesses the swapped out program, the swapped out program on the hard disk may change places with another program in RAM.

The aforementioned combination of RAM and swap files may be viewed as one interpretation of virtual memory. The use of virtual memory may allow a computing system to run more programs than it could run in RAM alone. In some embodiments, an operating system, such as Linux, Windows, Java, Unix, or the like, may set aside a permanent swap space that reserves a certain portion of the hard disk. According to one embodiment, permanent swap files may take a contiguous section of the hard disk.

A memory-mapped file may be a segment of virtual memory which has been assigned a direct byte-for-byte correlation with some portion of a file or file-like resource. This resource may be a file that is physically present on-disk or may be a device, shared memory object, or other resource that the operating system can reference through a file descriptor. Once present, the correlation between the file and the memory space may permit applications to treat the mapped portion as if it were primary memory. One benefit of memory mapping a file is increased input/output (I/O) performance, for example, when files being accessed are large. Therefore, in some embodiments, implementing a data expanse with memory-mapped files instead of swap files may lead to increased system performance.

Referring to FIG. 1B, the computing system may include a disk 120, a SAIL 122, and a memory 124. In some embodiments, the disk 120 may be a disk within an RIMS, and the memory 124 may be RAM. Other embodiments of the computing system are discussed below in connection with FIGS. 6-8. As shown in the embodiment of FIG. 1B, the SAIL 122 may include a memory mapping interface 126 that can assign and delete memory-mapped files. The SAIL 122 may also include a swap file paging interface 128 that can assign, delete, and/or recover operating system memory and other virtual space used by the computing system 100. The disk 120 may include a swap file 130 and a data expanse composed of memory mapped files 132. Although FIG. 1B illustrates the swap file 130 and the data expanse (memory mapped files) 132 both being on the same disk 120, in some embodiments, the swap file 130 and the data expanse (memory mapped files) 132 may be located on separate disks.

According to an embodiment, paging by the SAIL 122 may move data in and out of memory 124 from the swap file 130 and the data expanse (memory mapped files) 132. In some embodiments, an emulator 134 within the SAIL 122 may reference data directly into memory 124 using a virtual address assigned by either the swap file paging interface 128 or the memory mapping interface 126. For example, when an operating system needs memory for banks the operating system may call the swap file paging interface 128 to allocate the required memory and return a virtual address to the allocated memory. The allocated memory may be part of a swap space and may be shared with other applications executing in SAIL 122, such as network I/O. When a bank is no longer needed, a call may be made by the operating system to remove and recycle the memory space. According to another embodiment, when the operating system needs to assign a data expanse, the operating system may call the memory mapping interface 126 to initialize a memory mapped file and return a virtual address to the file.

Figure 2:
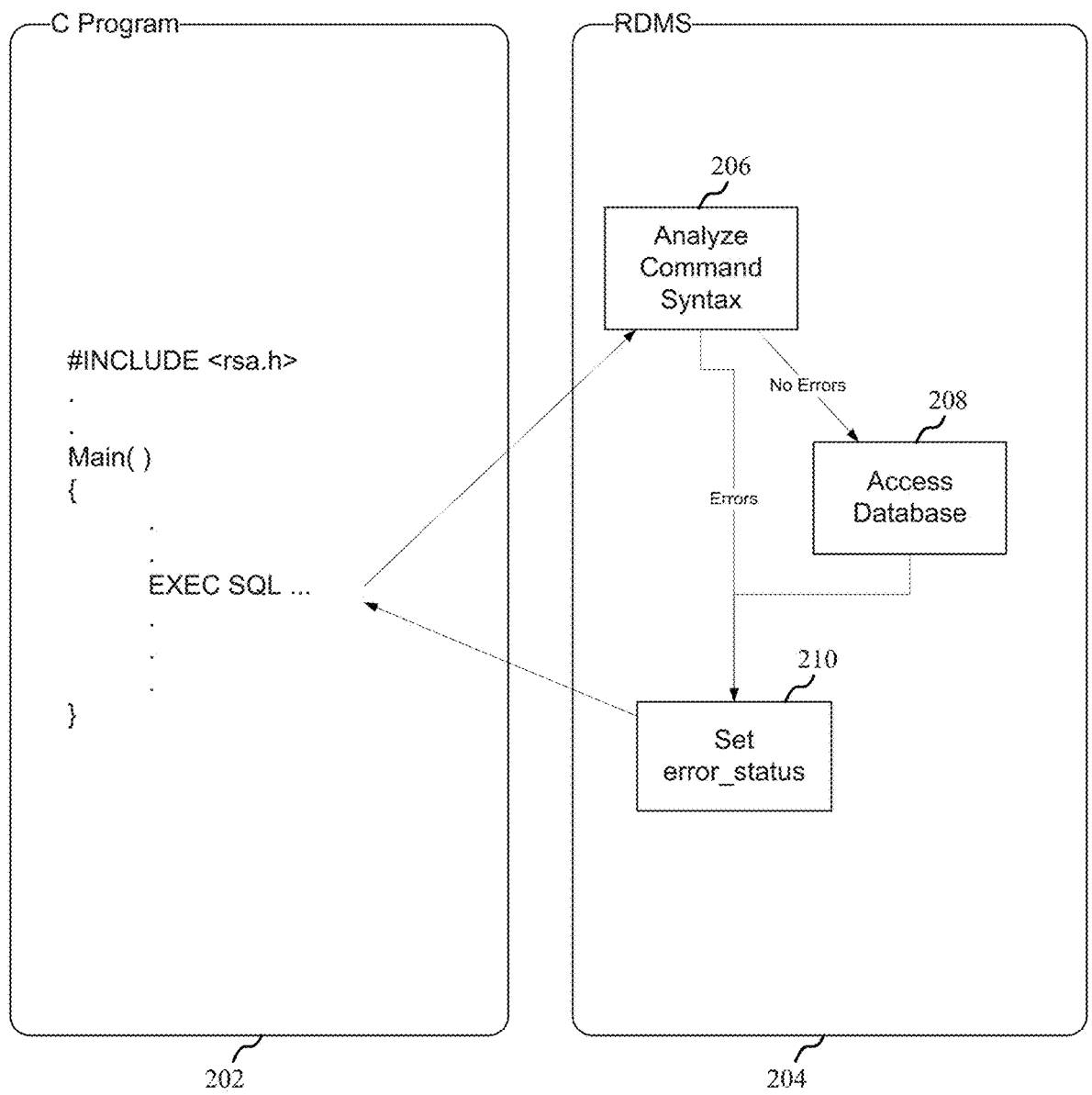
FIG. 2 is a schematic view illustrating a user application interface to a database management system and the handling of analytic queries at the database management system according to one embodiment of the disclosure.

FIG. 2 illustrates a user application interface to a database management system and the handling of analytic queries at the database management system according to one embodiment of the disclosure. In the embodiment shown, a user application 202 includes code, which can be written, for example, in C (as shown), or any of a variety of other types of programming languages, such as C++, Java, or other languages. The user application 202 may include a call to a database management program 204 within the code of the application, to effect access to a database, e.g., to read or edit data in the database managed by the database management program 204. In the example embodiment shown, the user application 202 includes a line of code in the C programming language indicated as "EXEC SQL . . . " which may represent a form of a line of code useable to call the database management program 204. In various embodiments, the user application 202 can be any of a variety of user applications useable to access and/or modify data in a database.

The database management program 204 can be any program implementing a database management system that is hosted by an underlying operating system. In an example embodiment, the database management program may correspond to a relational database management system, such as the relational database management system (RDMS) available from Unisys Corporation of Blue Bell, Pa. In alternative embodiments, other types of database management systems, and other arrangements of databases, could be used as well.

In the embodiment shown, the database management program 204 may include a syntax analyzer component 206, an access component 208, and an error status component 210. The components 206-210 may be used to access and validate access requests to data on behalf of the user application 202 by the database management program 204. The syntax analyzer component 206 may receive a database command from the user application 202, such as a SQL command, or other database command that will allow the application program to add, delete, insert, and update data in a database. In some embodiments, the syntax analyzer component 206 may determine an operation to be performed based on parsing of the received command.

If no errors are detected in the command, the access component 208 may interface with an underlying operating system to access file containing data associated with the database accessed by the user application 202 for parsing and use by the database management program 204. The access component 208 can then execute the database command as defined in the received command. In such a case, an error status component 210 may be set to indicate that no error has occurred in completion of the database operation. However, if an error is detected in the syntax analyzer component 206, or during performance of the command by the access component 208, error status component 210 may indicate that an error exists in the received database command. Accordingly, either a confirmation of the properly executed database command, or an indication of an error, can be returned from the error status component 210 to the user application 202.

In some embodiments, beyond passage of particular database commands from the user application 202, it is also possible for the database management program 204 to allow use of placeholder variables in a command string, and therefore transfer values from program variables in the C code of the program to the database, or from the database to program variables in the C code, thereby integrating the database as a mechanism for storage of large program constructs, such as variables of large size, variable classes, and other data structures used as variables and for which storage in a database is convenient.

In view of exemplary systems shown and described herein, methodologies that may be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 3:
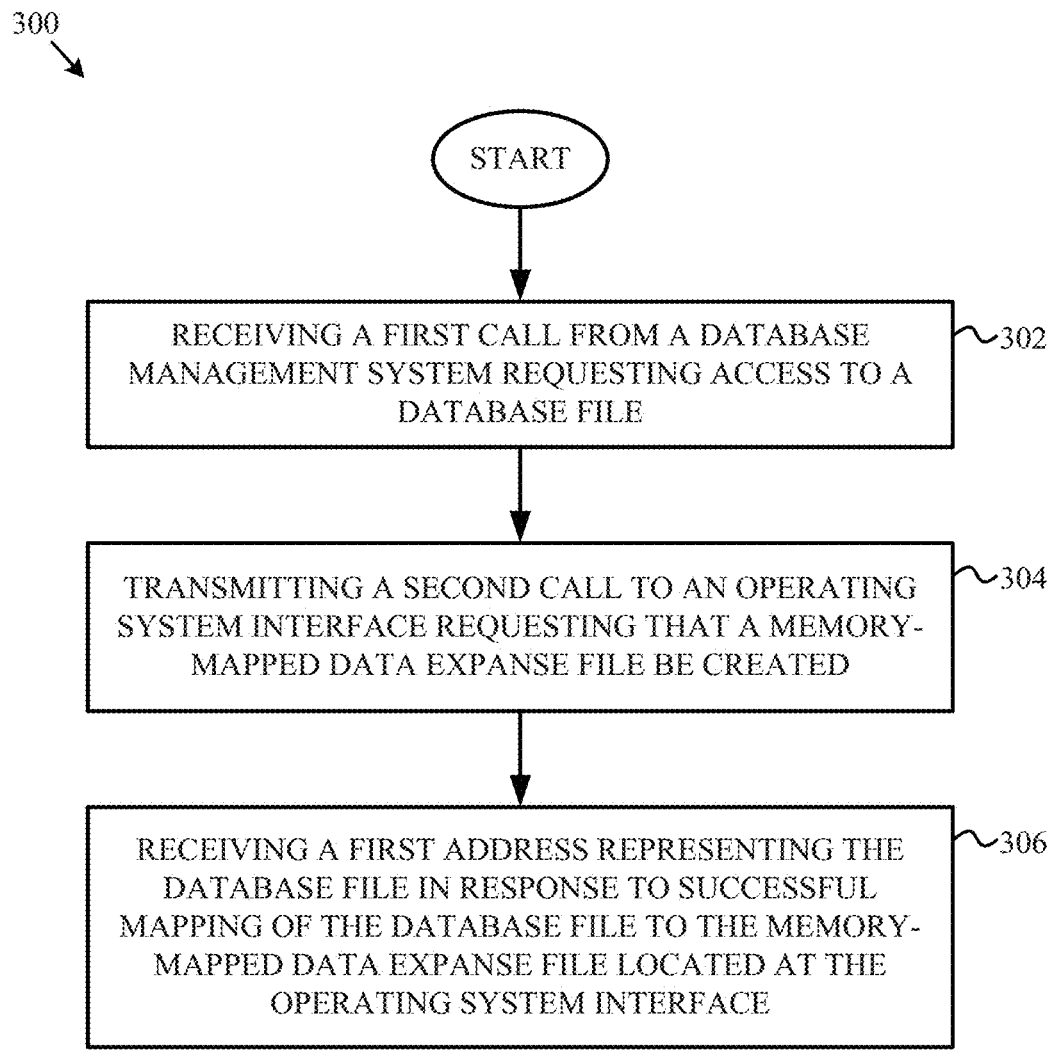
FIG. 3 is a flow chart illustrating a method for obtaining access to database files in a computing system according to one embodiment of the disclosure.

FIG. 3 illustrates a method 300 for obtaining access to database files in a computing system according to one embodiment of the disclosure. Embodiments of method 300 may be implemented with the systems described above with respect to FIGS. 1-4 and the systems described below with respect to FIGS. 6-8. Specifically, method 300 includes, at block 302, receiving a first call from a database management system requesting access to a database file. For example, in some embodiments, an operating system, such as the emulated operating system 106, may receive a CREAT$DATXP call from a database management system, such as database management system 104 or 120.

At block 304, method 300 includes transmitting a second call to an operating system interface requesting that a memory-mapped data expanse file be created. For example, in some embodiments, an operating system may transmit a call to an acquire function of the SAIL to create a memory-mapped data expanse file at the SAIL. In some embodiments, file naming conventions at the operating system and/or the database management system may be different than file naming conventions at the SAIL, so some calls that include file names from the database management system or the operating system may not be compatible with the SAIL. Therefore, in some embodiments, a call received at the operating system may be converted from a call compatible with the operating system and/or database management system to a call compatible with the SAIL before transmitting the call to the SAIL.

At block 306, method 300 includes receiving a first address representing the database file in response to successful mapping of the database file to the memory-mapped data expanse file located at the operating system interface. For example, an operating system, such as the emulated operating system 106, may receive an address from the SAIL, such as SAIL 108 or 122, when a database file has been successful mapped to a memory-mapped file located at the SAIL. Once the memory mapped file has been created, the operating system 106 may read the specified RDMS file 142 into the corresponding RDMS memory mapped file 116.

In some embodiments, the first address received by the operating system may be transmitted to the database management system so as to provide access to the memory-mapped data expanse file to the database management system. When the database management system requires access to data in the memory-mapped data expanse file, the database management system may transmit a call to the operating system, where the call specifies an address and a size of a view of the database file to be created. Subsequently, the operating system may transmit a second address to the database management system, where the second address may represent the address of the view of the database file from the memory-mapped data expanse file. In some embodiments, the second address transmitted from the operating system to the database management system may be an extended mode virtual address. The extended mode virtual address can be based by RDMS to provide a view (window) into the data base.

The schematic flow chart diagram of FIG. 3 is generally set forth as a logical flow chart diagram. As such, the depicted order and labeled steps are indicative of one aspect of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
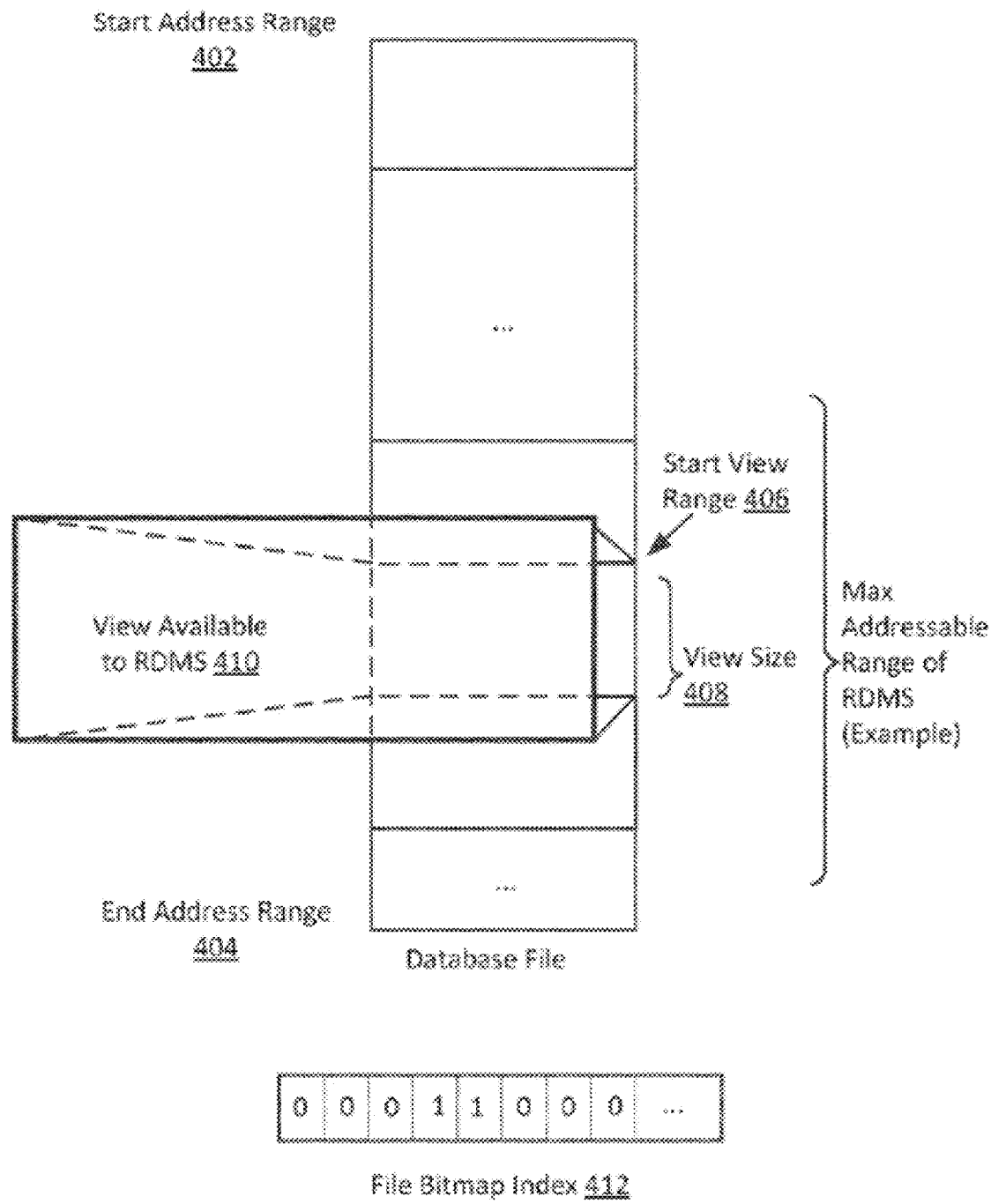
FIG. 4 is an illustration showing an address range of a database file and a view of the database file available to a database management system according to one embodiment of the disclosure.

In some embodiments, the database management system may not need access to all the data in the database file from the OS disk subsystem that is mapped to the memory-mapped data expanse file or the size of the database file may be greater than the address range available to the database management system, so the size of the view requested by the database management system may be less than the size of the database file mapped to the memory-mapped data expanse file. For example, FIG. 4 is an illustration showing an address range of a database file and a view of the database file available to a database management system. As illustrated in FIG. 4, the database file, such as a memory-mapped data expanse file 116 loaded from the OS disk subsystem into a memory of a computing system, may be addressable over a range of addresses, from a start address 402 to an end address 404. Within that range of addresses, a smaller range may exist, which represents an overall word-addressable range of a database management system. Once the start address of the location in memory where the database file is loaded is known (i.e., start address 402), that address may be included in the returned data in response to an initial call (e.g., CREAT$DATAXP). The address can be used by the database management system 104 or 120 to allow for requests to create one or more views, for example by transmitting from the RDMS data expanse control 110 or 132 a second call (e.g., DX$VIEW) including a particular starting address 406 for the view and its size 408, which results in creation of view 410. It is noted that, as illustrated, the view may be smaller in size than the maximum addressable range of the database management system, and can be located at any address relative to the start address (e.g., a bank descriptor index).

In some embodiments, the logical diagram also includes a bitmap index 412 defining the existing views across the memory-mapped database file 116. In particular, when some views are created, the bitmap index 412 can be updated (e.g., by changing from a 0 to a 1) to indicate that the view is present, thereby preventing a second view from being created that overlaps with that view. It is noted that other mechanisms are possible to use as well.

Figure 5:
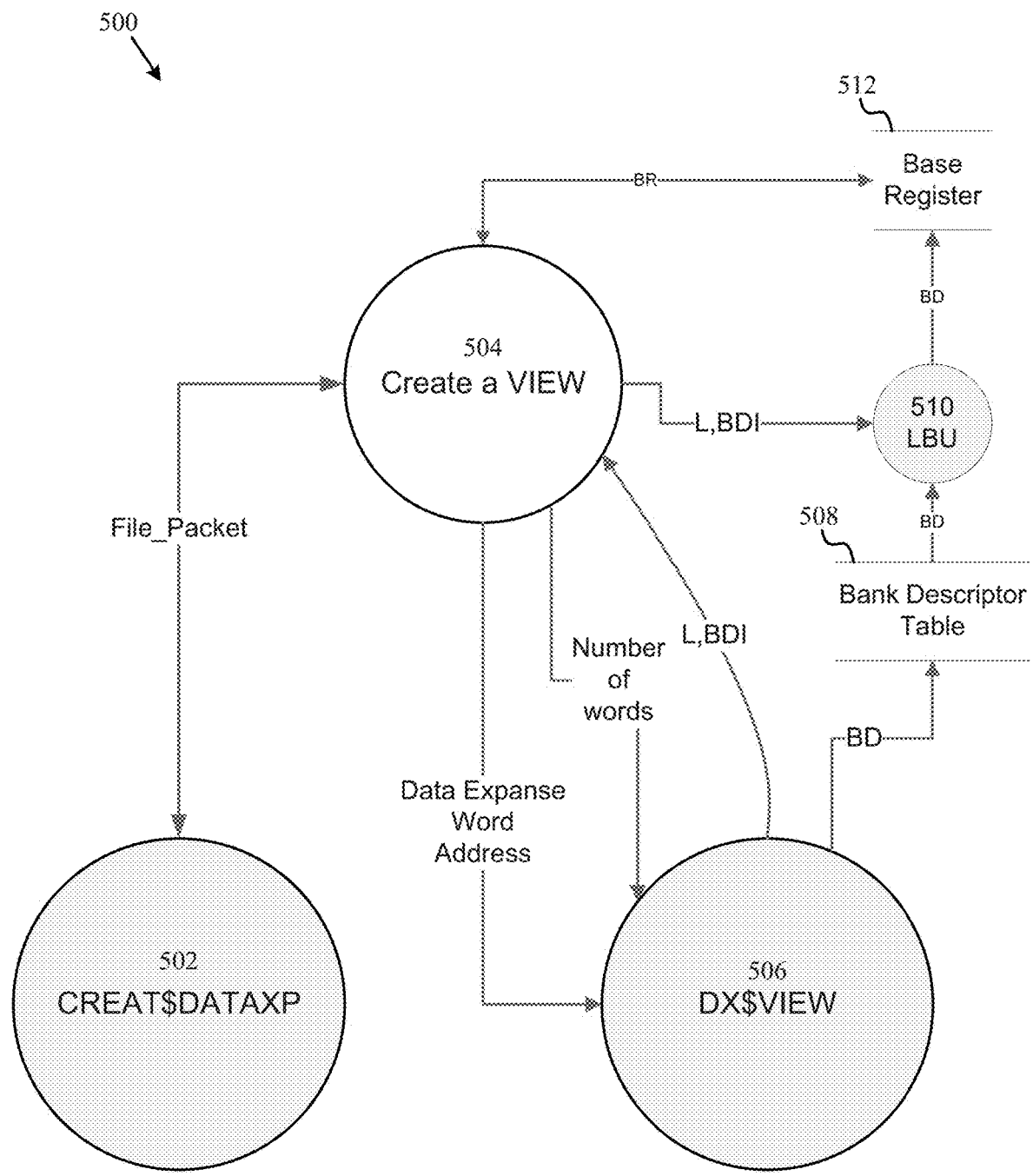
FIG. 5 is a state diagram illustrating operations of the computing system according to one embodiment of the disclosure.

FIG. 5 is a state diagram illustrating operations of the computing system. In the data flow diagram 500, an initial view may be created by the CREAT$DATAXP call at state 502. This may result in the passing of a File Jacket parameter from database management system 104 or 120 to the emulated operating system 106 which checks for errors. If there are no errors, the operating system may call the SAIL to acquire a memory mapped file 116. In some embodiments, a general DX$VIEW address (i.e., a gate) may be returned to the database management system 104 or 120. According to the embodiment of FIG. 5, a view can be created at state 504 by calling the returned DX$VIEW gate 506 with a word address and a number of words to view (i.e., the address and size of the view). The word address can be a mass storage relative word address for the view, and the number of words can be limited to the maximum addressable range of the database management system (e.g., 262 k Words, in one example above). If there are no errors, a corresponding bank descriptor table 508 is created with the lower and upper limits of the view the corresponding extended mode virtual address (L,BDI,OFFSET) is returned, L,BDI,offset. The view can subsequently be accessed by the database management system by basing the bank (L,BDI,OFFSET) with an LBU instruction 510, which may cause the specified base register 512 to be loaded. The database management system can at that point read and/or modify data within the view using the base register as part of an instruction operand.

Figure 6:
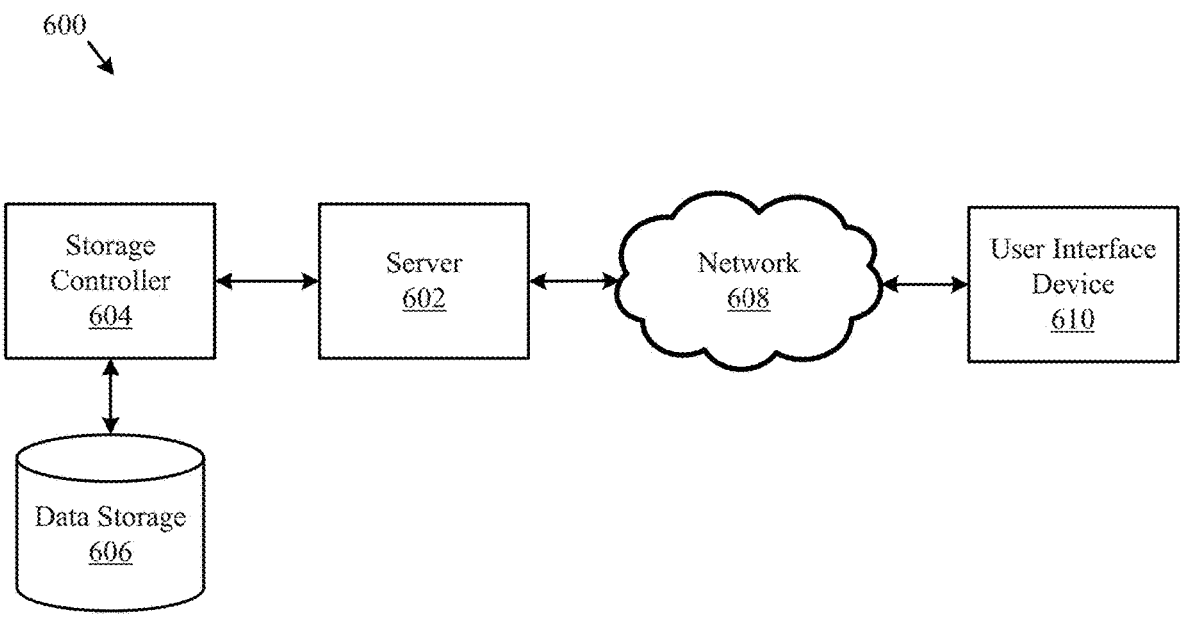
FIG. 6 is a block diagram illustrating a computer network according to one embodiment of the disclosure.

FIG. 6 illustrates a computer network 600 for obtaining access to database files in a computing system according to one embodiment of the disclosure. The system 600 may include a server 602, a data storage device 606, a network 608, and a user interface device 610. The server 602 may also be a hypervisor-based system executing one or more guest partitions hosting operating systems with modules having server configuration information. In a further embodiment, the system 600 may include a storage controller 604, or a storage server configured to manage data communications between the data storage device 606 and the server 602 or other components in communication with the network 608. In an alternative embodiment, the storage controller 604 may be coupled to the network 608.

In one embodiment, the user interface device 610 is referred to broadly and is intended to encompass a suitable processor-based device such as a desktop computer, a laptop computer, a personal digital assistant (PDA) or tablet computer, a smartphone or other mobile communication device having access to the network 608. In a further embodiment, the user interface device 610 may access the Internet or other wide area or local area network to access a web application or web service hosted by the server 602 and may provide a user interface for enabling a user to enter or receive information.

The network 608 may facilitate communications of data between the server 602 and the user interface device 610. The network 608 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 7:
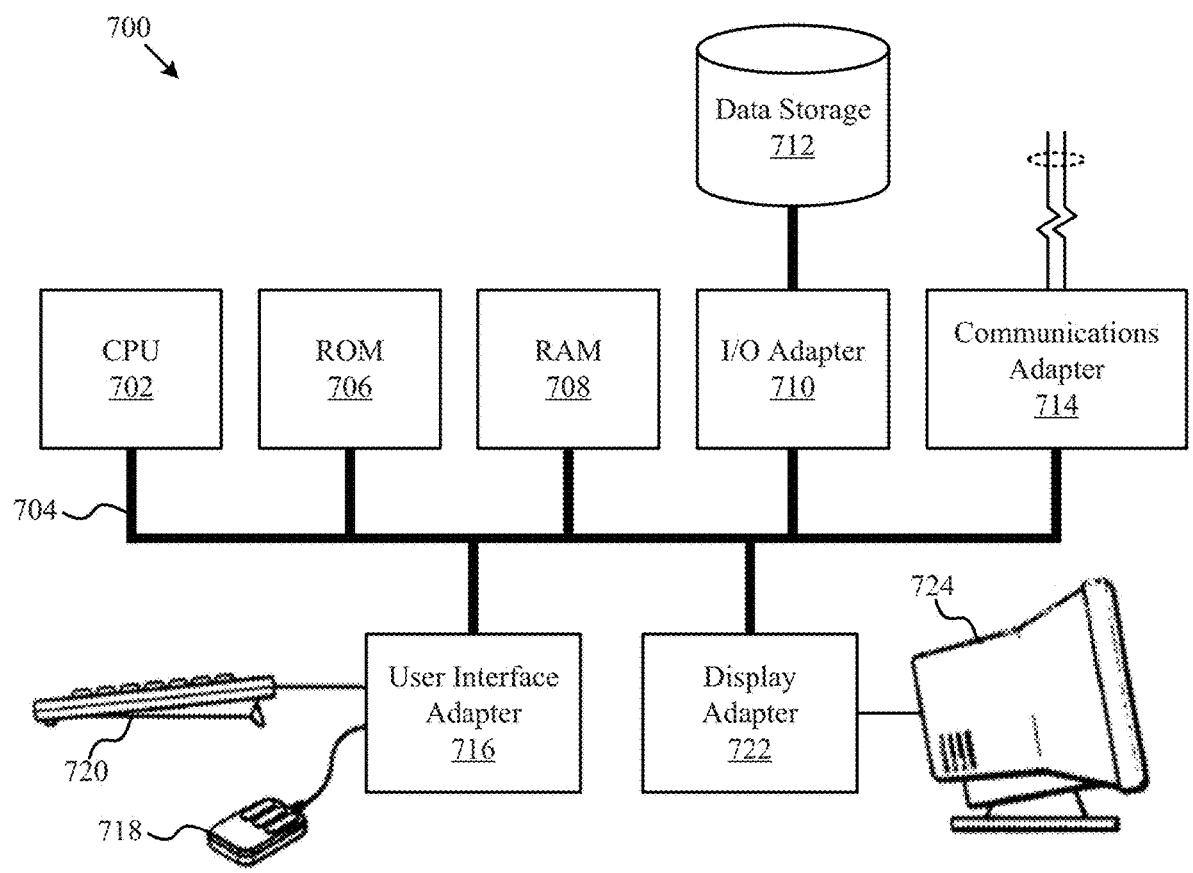
FIG. 7 is a block diagram illustrating a computer system according to one embodiment of the disclosure.

FIG. 7 illustrates a computer system 700 adapted according to certain embodiments of the server 602 and/or the user interface device 610. The central processing unit ("CPU") 702 is coupled to the system bus 704. The CPU 702 may be a general purpose CPU or microprocessor, graphics processing unit ("GPU"), and/or microcontroller. The present embodiments are not restricted by the architecture of the CPU 702 so long as the CPU 702, whether directly or indirectly, supports the operations as described herein. The CPU 702 may execute the various logical instructions according to the present embodiments.

The computer system 700 may also include random access memory (RAM) 708, which may be synchronous RAM (SRAM), dynamic RAM (DRAM), synchronous dynamic RAM (SDRAM), or the like. The computer system 700 may utilize RAM 708 to store the various data structures used by a software application. The computer system 700 may also include read only memory (ROM) 706 which may be PROM, EPROM, EEPROM, optical storage, or the like. The ROM may store configuration information for booting the computer system 700. The RAM 708 and the ROM 706 hold user and system data, and both the RAM 708 and the ROM 706 may be randomly accessed.

The computer system 700 may also include an I/O adapter 710, a communications adapter 714, a user interface adapter 716, and a display adapter 722. The I/O adapter 710 and/or the user interface adapter 716 may, in certain embodiments, enable a user to interact with the computer system 700. In a further embodiment, the display adapter 722 may display a graphical user interface (GUI) associated with a software or web-based application on a display device 724, such as a monitor or touch screen.

The I/O adapter 710 may couple one or more storage devices 712, such as one or more of a hard drive, a solid state storage device, a flash drive, a compact disc (CD) drive, a floppy disk drive, and a tape drive, to the computer system 700. According to one embodiment, the data storage 712 may be a separate server coupled to the computer system 700 through a network connection to the I/O adapter 710. The communications adapter 714 may be adapted to couple the computer system 700 to the network 608, which may be one or more of a LAN, WAN, and/or the Internet. The user interface adapter 716 couples user input devices, such as a keyboard 720, a pointing device 718, and/or a touch screen (not shown) to the computer system 700. The display adapter 722 may be driven by the CPU 702 to control the display on the display device 724. Any of the devices 702-722 may be physical and/or logical.

The applications of the present disclosure are not limited to the architecture of computer system 700. Rather the computer system 700 is provided as an example of one type of computing device that may be adapted to perform the functions of the server 602 and/or the user interface device 710. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 700 may be virtualized for access by multiple users and/or applications.

Figure 8A:
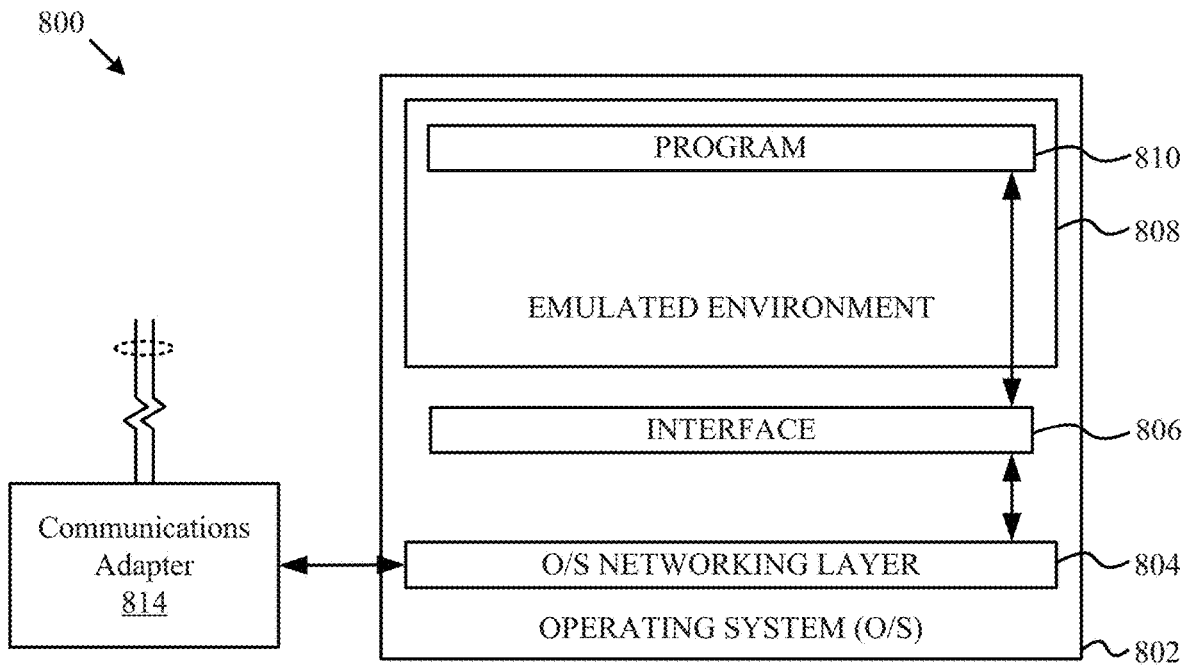
FIG. 8A is a block diagram illustrating a server hosting an emulated software environment for virtualization according to one embodiment of the disclosure.

FIG. 8A is a block diagram illustrating a server hosting an emulated software environment for virtualization according to one embodiment of the disclosure. An operating system 802 executing on a server includes drivers for accessing hardware components, such as a networking layer 804 for accessing the communications adapter 814. The operating system 802 may be, for example, Linux or Windows. An emulated environment 808 in the operating system 802 executes a program 810, such as Communications Platform (CPComm) or Communications Platform for Open Systems (CPCommOS). The program 810 accesses the networking layer 804 of the operating system 802 through a non-emulated interface 806, such as extended network input output processor (XNIOP). The non-emulated interface 806 translates requests from the program 810 executing in the emulated environment 808 for the networking layer 804 of the operating system 802.

Figure 8B:
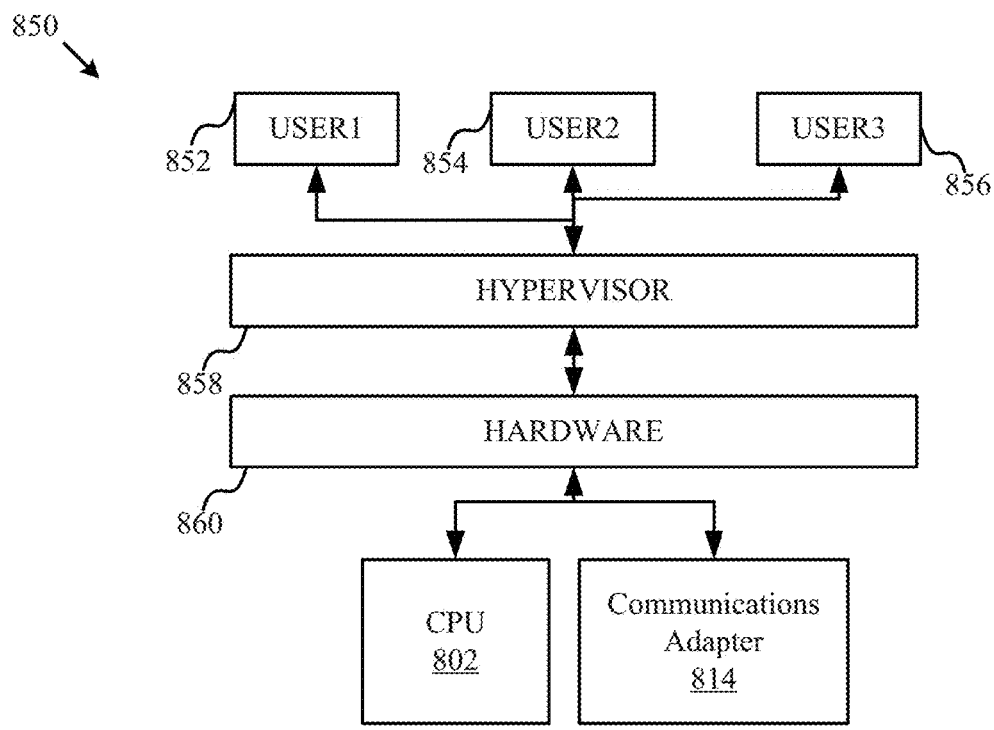
FIG. 8B is a block diagram illustrating a server hosting an emulated hardware environment according to one embodiment of the disclosure.

In another example, hardware in a computer system may be virtualized through a hypervisor. FIG. 8B is a block diagram illustrating a server hosting an emulated hardware environment according to one embodiment of the disclosure. Users 852, 854, 856 may access the hardware 860 through a hypervisor 858. The hypervisor 858 may be integrated with the hardware 860 to provide virtualization of the hardware 860 without an operating system, such as in the configuration illustrated in FIG. 8A. The hypervisor 858 may provide access to the hardware 860, including the CPU 802 and the communications adaptor 814.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for obtaining access to database files in a computing system that includes computing hardware, an underlying operating environment executing on the computing hardware, the underlying operating environment defining a first file system, an emulated operating system executing over the underlying operating environment, the emulated operating system defining a second file system that is distinct from the first file system, and an operating system interface that facilitates access to the first file system from the emulated operating system, the method comprising:

receiving, at the emulated operating system, a first call from a database management system executing over the emulated operating system, the first call requesting access to a database file in the second file system;

transmitting, from the emulated operating system, a second call to the operating system interface requesting that a memory-mapped data expanse file be created in the first file system and managed by the operating system interface, the memory-mapped data expanse file containing content of the database file in the second file system and being distinct from any swap file used for virtual-memory paging of programs other than the database management system;

receiving, at the emulated operating system, a first mapped address representing the memory-mapped data expanse file in response to successful transfer of the content of the database file in the second file system to the memory-mapped data expanse file;

transmitting the first mapped address to the database management system such that the database management system accesses a bank of memory addresses without having to cache the memory-mapped data expanse file; and receiving, at the emulated operating system, a third call from the database management system, wherein the third call specifies a view address and a size of a view to be created of the memory-mapped data expanse file;

wherein the first call is converted from a call compatible with the database management system to a call compatible with the operating system interface, wherein the second call is compatible with the operating system interface.

2. The method of claim 1, wherein the second address comprises an extended mode virtual address.

3. The method of claim 1, wherein the database file in the second file system has a size greater than an address range available to the database management system.

4. The method of claim 1, wherein a plurality of memory-mapped data expanse files are located at the operating system interface, and wherein each memory-mapped data expanse file of the plurality of memory-mapped data expanse files represents a different mapping to a different database file in the second file system.

5. The method of claim 1, wherein the database file in the second file system is physically stored in an external disk.

6. A computer program product operable in a computing system that includes computing hardware, an underlying operating environment executing on the computing hardware, the underlying operating environment defining a first file system, an emulated operating system executing over the underlying operating environment, the emulated operating system defining a second file system that is distinct from the first file system, and an operating system interface that facilitates access to the first file system from the emulated operating system, comprising:

a non-transitory computer-readable medium comprising instructions which, when executed by a processor of the computing system, cause the processor to perform operations including:

receiving, at the emulated operating system, a first call from a database management system requesting access to a database file in the second file system in the second file system, the database management system executing over the emulated operating system;

transmitting, from the emulated operating system, a second call to the operating system interface requesting that a memory-mapped data expanse file be created in the first file system and managed by the operating system interface, the memory-mapped data expanse file containing content of the database file in the second file system and being distinct from any swap file used for virtual-memory paging of programs other than the database management system;

receiving, at the emulated operating system, a first mapped address representing the memory-mapped data expanse file in response to successful transfer of the content of the database file in the second file system to the memory-mapped data expanse file; and transmitting the first mapped address to the database management system such that the database management system accesses a bank of memory addresses without having to cache the memory-mapped data expanse file;

receiving, at the emulated operating system, a third call from the database management system, wherein the third call specifies a view address and a size of a view to be created of the memory-mapped data expanse file; and transmitting, from the emulated operating system, the view address to the database management system;

wherein the first call is converted from a call compatible with the database management system to a call compatible with the operating system interface, wherein the second call is compatible with the operating system interface.

7. The computer program product of claim 6, wherein the second address comprises an extended mode virtual address.

8. The computer program product of claim 6, wherein the database file in the second file system has a size greater than an address range available to the database management system.

9. The computer program product of claim 6, wherein a plurality of memory-mapped data expanse files are located at the operating system interface, and wherein each memory-mapped data expanse file of the plurality of memory-mapped data expanse files represents a different mapping to a different database file in the second file system.

10. The computer program product of claim 6, wherein the database file is physically stored in an external disk.

11. An apparatus, comprising:

computing hardware including memory and a processor coupled to the memory, an underlying operating environment executing on the computing hardware, the underlying operating environment defining a first file system, an emulated operating system executing over the underlying operating environment, the emulated operating system defining a second file system that is distinct from the first file system, and an operating system interface that facilitates access to the first file system from the emulated operating system; and wherein the processor is configured to execute operations including:

receiving, at the emulated operating system, a first call from a database management system requesting access to a database file in the second file system in the second file system, the database management system executing over the emulated operating system;

transmitting, from the emulated operating system, a second call to the operating system interface requesting that a memory-mapped data expanse file be created in the first file system and managed by the operating system interface, the memory-mapped data expanse file containing content of the database file in the second file system and being distinct from any swap file used for virtual-memory paging of programs other than the database management system;

receiving, at the emulated operating system, a first mapped address representing the memory-mapped data expanse file in response to successful transfer of the content of the database file in the second file system to the memory-mapped data expanse file; and transmitting the first mapped address to the database management system such that the database management system accesses a bank of memory addresses without having to cache the memory-mapped data expanse file; and receiving, at the emulated operating system, a third call from the database management system, wherein the third call specifies a view address and a size of a view to be created of the memory-mapped data expanse file;

wherein the first call is converted from a call compatible with the database management system to a call compatible with the operating system interface, wherein the second call is compatible with the operating system interface.

12. The apparatus of claim 11, wherein the second address comprises an extended mode virtual address.

13. The apparatus of claim 11, wherein the database file in the second file system has a size greater than an address range available to the database management system, and wherein the database file in the second file system is physically stored in an external disk.

14. The apparatus of claim 11, wherein a plurality of memory-mapped data expanse files are located at the operating system interface, and wherein each memory-mapped data expanse file of the plurality of memory-mapped data expanse files represents a different mapping to a different database file in the second file system.

* * * * *